United States Patent [19]

Kuroda

[11] Patent Number: 4,719,465
[45] Date of Patent: Jan. 12, 1988

[54] MONOPULSE RADAR EQUIPMENT

[75] Inventor: Yuichi Kuroda, Yokohama, Japan

[73] Assignee: Kabushiki Kaisha Toshiba, Kawasaki, Japan

[21] Appl. No.: 790,083

[22] Filed: Oct. 22, 1985

[30] Foreign Application Priority Data

Nov. 1, 1984 [JP] Japan .................................. 59-230653

[51] Int. Cl.⁴ .............................................. G01S 13/00
[52] U.S. Cl. ........................................................ 342/151
[58] Field of Search .................. 342/149, 80, 151, 173, 342/174

[56] References Cited

U.S. PATENT DOCUMENTS

| | | | |
|---|---|---|---|
| 3,883,870 | 5/1975 | Kunz . | |
| 4,124,849 | 11/1978 | Zahornosky et al. | 342/149 |
| 4,143,372 | 3/1979 | Saluandon et al. | 342/149 |
| 4,210,911 | 7/1980 | Jacomini | 342/149 |
| 4,568,940 | 2/1986 | Diamond | 342/149 |

Primary Examiner—Thomas H. Tarcza
Assistant Examiner—D. E. Hayes
Attorney, Agent, or Firm—Oblon, Fisher, Spivak, McClelland & Maier

[57] ABSTRACT

A monopulse radar equipment is developed which comprises first and second radiators arranged in symmetrical positions with respect to the boresight axis to radiate radar pulses in a predetermined cycle and thus to produce first and second directional radiation patterns, a beam forming network for synthesizing in an in-phase and opposite-phase relation the first and second directional radiation patterns of the first and second radiations into sum and different patterns, and a multichannel receiver for forming from the sum and difference patterns an off-boresight signal representing a deviation of a target object from the boresight direction and a sidelobe suppressed signal resulting from suppressing a sidelobe response of the sum pattern. The first and second directional couplers are interposed on the sum and difference pattern signal transmission channels between the beam forming network and the multichannel receiver. The first and second calibration signals of the same amplitude and phase are injected onto the sum and difference pattern signal transmission channels through the first and second directional couplers. The calibration signal is detected at the output terminal of the multichannel receiver and the phase characteristics between the sum and difference pattern signal transmission channels are compensated for in accordance with a result of detection.

25 Claims, 7 Drawing Figures

F I G. 2
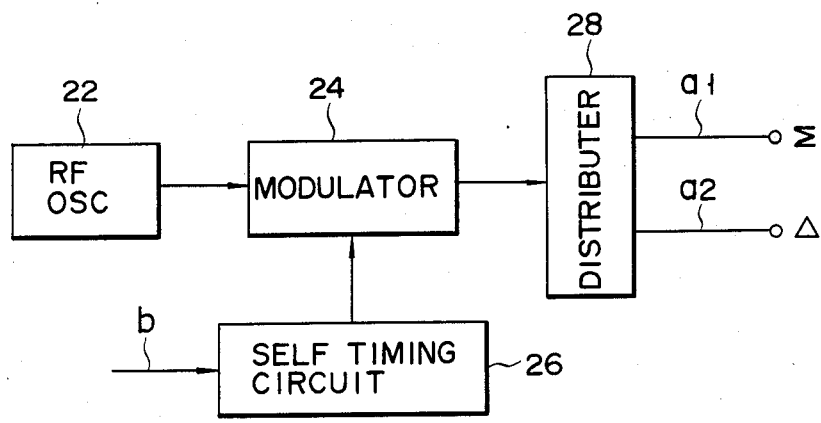
F I G. 4A
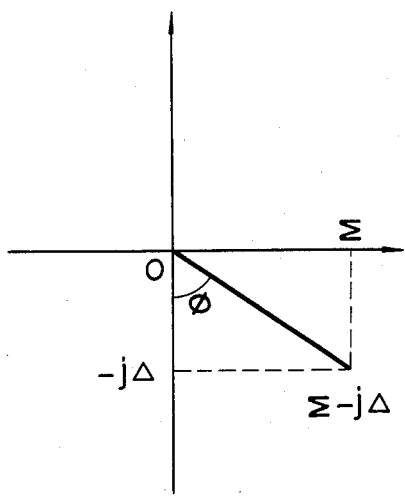
F I G. 4B
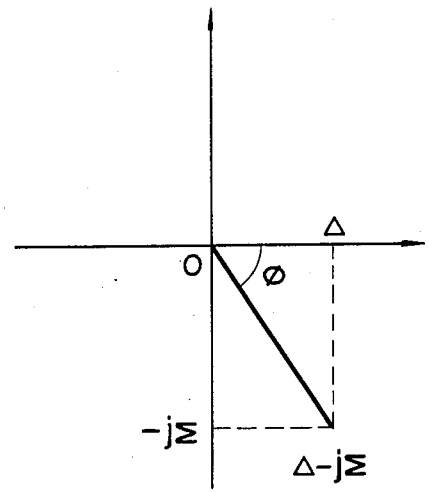

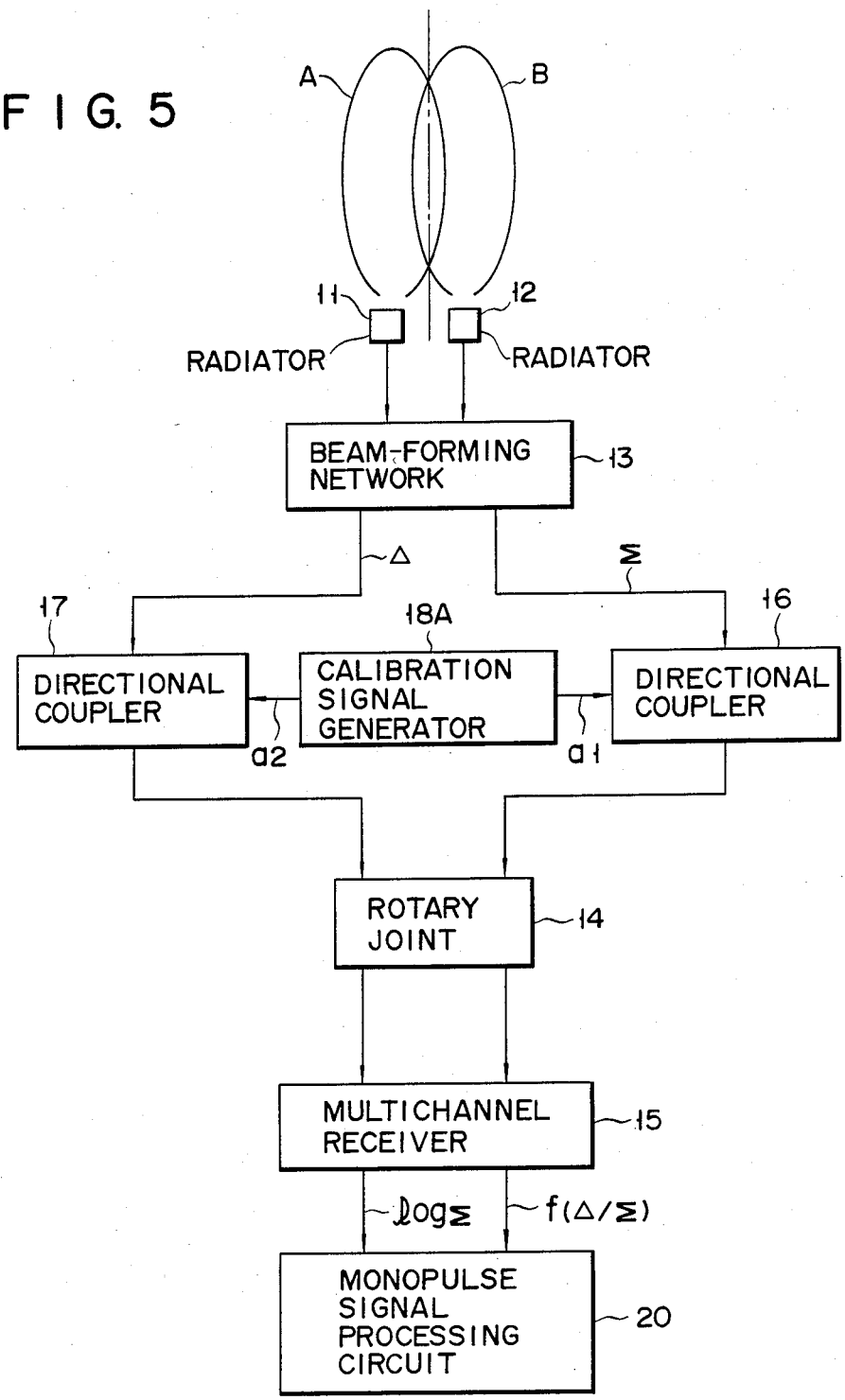

MONOPULSE RADAR EQUIPMENT

BACKGROUND OF THE INVENTION

This invention relates to a monopulse radar equipment which is applied to, for example, a friend/foe identification apparatus and a secondary surveillance radar equipment for air traffic control.

A monopulse radar equipment has now been developed which is adapted to simultaneously emit radar pulses toward a target object from two antennas of different directionality and to find the direction of the target object from sum and difference patterns of radiation patterns obtained. The apparatus, though being used for the tracking of the target object, has recently been applied to, for example, a secondary surveillance radar equipment and a mode-S system for air traffic control.

In general, the monopulse radar equipment includes first and second radiators arranged in symmetrical positions with respect to a boresight axis of its antenna. The monopulse radar equipment emitting radar pulses symmetrically with respect to the boresight axis through the first and second radiators, extracting horizontal patterns from two directional antenna patterns obtained and entering them into a beam forming network where they are synthesized in an in-phase and opposite-phase fashion to form a sum pattern $\Sigma$ and difference pattern $\Delta$. The sum pattern $\Sigma$ and difference pattern $\Delta$ are entered, through a rotary joint, into a coherent type amplitude comparison multichannel receiver. The multichannel receiver produces, from the sum pattern $\Sigma$ and difference pattern $\Delta$, an off-boresight signal f ($\Delta/\Sigma$) corresponding to a deviation of a target object from a boresight axis (where f denotes a function) and a sidelobe suppressed signal log $\Sigma$ in which the sidelobe response of the sum pattern is suppressed. These signals f ($\Delta/\Sigma$) and log $\Sigma$ are supplied to a monopulse signal processing circuit to detect the target object and its direction from single radar pulse response.

A brief explanation will be given below about the generation process of the off-boresight signal f ($\Delta/\Sigma$) and sidelobe suppression signal log $\Sigma$.

A $\pi/2$ hybrid obtains $\Sigma-j\Delta$ and $\Delta-j\Sigma$ signals from the sum pattern signal $\Sigma$ and difference pattern signal $\Delta$. These signals are converted by mixers to intermediate frequency signals. A phase comparison is made between $\pi-j\Delta$ signal and the reference phase signal $-j$ and between $-\Delta+j\Sigma$ signal and the reference phase signal $-1$ both to obtain a cos $\phi$. The cos $\phi$ signals are added together to obtain 2 cos $\phi=f(\Delta/\Sigma)$, where $$\phi=\pi/2-\tan^{-1}(\Delta/\Sigma)$$

A logarithmic amplifier receives the $\Sigma$ signal and produces a log $\Sigma$.

In the monopulse radar equipment using a coherent type amplitude comparison multichannel receiver, it has not been possible to measure a correct direction of the target object if any unbalance occurs between the two channels for the sum $\Sigma$ and difference $\Delta$. For this reason, it is required that:

(1) In a feeder between the multichannel receiver and the radiator a balance should be attained in the amplitude (as determined by a feeder loss) and phase (as determined by a feeder length) characteristics between the sum $\Sigma$ channel and the difference $\Delta$ channel.

(2) In the multichannel receiver a balance should be attained in the amplitude and phase characteristics between the $\Sigma-j\Delta$ and $\Delta-j\Sigma$ channels.

Stated in more detail, the following adjustments are required:

(1) An adjustment is made for the symmetrical relation (In the case of an array type antenna the current excitation distribution, and in a reflector-equipped antenna the characteristics and configuration of the radiators and the mechanical strength of the reflector) of the first and second radiators.

(2) An adjustment is made for attaining a balance of the feeder loss and feeder length between the $\Sigma$ and $\Delta$ channels (including a rotary joint).

(3) An adjustment is made for attaining a balance of the amplitude and phase characteristics between the respective elements and the lines connecting these elements on the $\Sigma-j\Delta$ and $\Delta-j\Sigma$ channels.

(4) An adjustment is made for maintaining a predetermined phase relation between the reference oscillation signals which are supplied from a local oscillator to mixers in the conversion of the $\Delta$ and $\Sigma$ radio frequency signals to the $\Delta$ and $\Sigma$ intermediate frequency signals and between the reference phase signals $-j$ and $-1$ which are supplied to phase comparators.

However, these adjustments require a lot of skill and it is difficult to make these adjustments accurately. At the outset, an error budget is properly set to individually adjust the feeder, rotary joint, receiver, etc., but it is difficult to make a final, practical evaluation. Further, since the temperature variation and aging of the individual elements and lines do not occur predictably on both the channels, no proper measure has been made against that situation.

SUMMARY OF THE INVENTION

It is accordingly the object of this invention to provide a highly accurate monopulse radar equipment which can comprehensively evaluate and compensate for an unbalance in the amplitude and phase characteristics between two channels in the feeder and receiver, as well as the aging and temperature variation of associated elements and their lines.

According to this invention there is provided a monopulse radar equipment comprising first and second radiators arranged in symmetrical positions with respect to a boresight axis for radiating radar pulses in a predetermined cycle and for producing first and second directional radiation pattern, beam forming means for synthesizing the first and second directional radiation patterns, in an in-phase and opposite-phase relation and for producing a sum radiation pattern signal and a difference radiation pattern signal, a multichannel receiver for generating, from the sum and difference pattern signals, an off-boresight signal representing a deviation of a target object from the boresight axis, first and second directional couplers arranged in sum and difference pattern signal transmission channels between the beam forming means and the multichannel receiver, calibration signal generating means connected to the first and second directional couplers for injecting first and second calibration signals into the sum and difference pattern signal transmission channels, and compensating means connected to an output of the multichannel receiver for detecting the calibration signal and for compensating for a phase characteristic and/or an amplitude characteristic on the sum and difference pattern signal transmission channels in accordance with a result of detection.

BRIEF DESCRIPTION OF THE DRAWINGS

FIG. 2 is a block diagram showing a calibration signal generator of FIG. 1;

FIGS. 4A and 4B are views showing an input-to-output relation of a $\pi/2$ hybrid of FIG. 3 supplied with $\Sigma$ and $\Delta$ pattern signals;

FIG. 5 is a block diagram showing a monopulse radar equipment according to second embodiment of this invention.

DETAILED DESCRIPTION OF THE PREFERRED EMBODIMENTS

A monopulse radar equipment according to this invention will be explained below with reference to the accompanying drawings.

Figure 1:
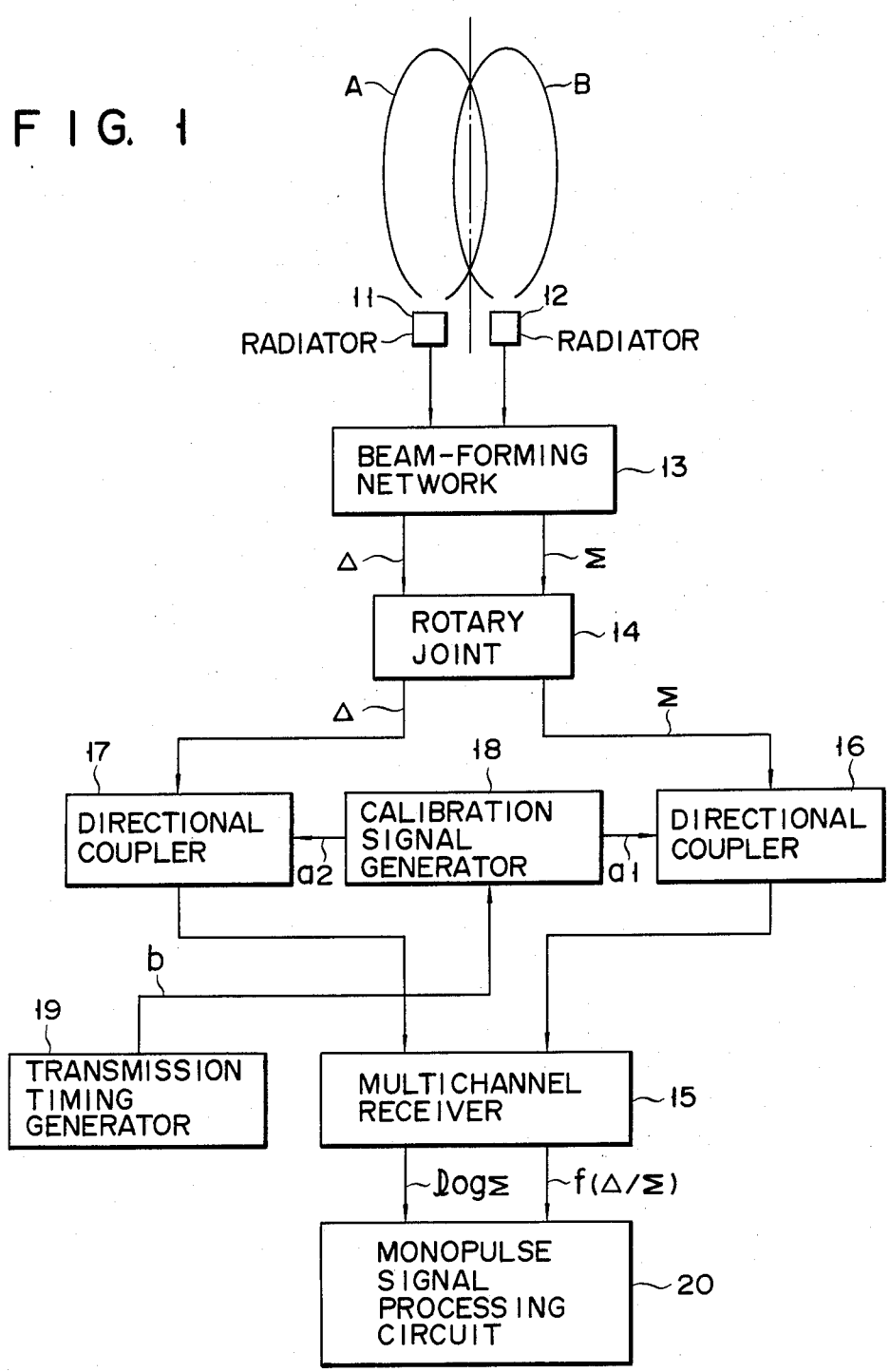
FIG. 1 is a block diagram showing a monopulse radar equipment according to one embodiment of this invention.

FIG. 1 is a block diagram showing the radar equipment according to one embodiment of this invention. In FIG. 1, first and second radiators 11 and 12 are located with a boresight axis (a dot-dash line) arranged in symmetrical positions. The radiator 11 may be an array which consists of plural radiators. The radiator 12 also may be so. Horizontal patterns are taken out from two directional antennas, through radiation of radar pulses in the mirror-image relation to the boresight axis. The beam forming network 13 synthesizes the horizontal patterns in in-phase and opposite-phase relation into sum pattern $\Sigma$ and difference pattern $\Delta$. The received signals from these sum pattern $\Sigma$ and difference pattern $\Delta$ are entered through a rotary joint 14 into a multichannel receiver 15 of a coherent amplitude comparison type. The multichannel receiver 15 generates an off-boresight signal $f(\Delta/\Sigma)$ and a sidelobe suppressed signal $\log \Sigma$ from the sum pattern $\Sigma$ and difference pattern $\Delta$. These signals $f(\Delta/\Sigma)$ and $\log \Sigma$ are supplied to a monopulse signal processing circuit 20 to detect a target object and obtain the direction of the target object. Though not shown, between the rotary joint 14 and the multichannel receiver 15 a radar pulse transmitter is connected through a duplexer and a radar pulse is radiated, in a predetermined period, from the radiators 11 and 12 toward the target object. In this embodiment, in addition to the transmitter and the receiver, a set of calibrating equipments is also provided for evaluating and compensating for an unbalanced state between the sum and difference channels. That is, directional couplers 16 and 17 are arranged at the sum $\Sigma$ and difference $\Delta$ channels between the rotary joint 14 and the multichannel receiver 15. Through the directional couplers 16 and 17, radio frequency calibration signals a1 and a2 are injected from the calibration signal generator 18 into the sum $\Sigma$ and difference $\Delta$ channels, while maintaining the same amplitude and phase relation. A transmission timing generator 19 is adapted to determine the transmission timing of the radar pulse through the transmitter, and sends the transmission timing signal b to the calibration signal generator 18.

FIG. 2 shows a detail of the calibration signal generator 18. A radio frequency (RF) oscillator 22 sends a radio frequency continuous wave to a modulator 24. The transmission timing generator 19 sends a transmission timing signal b to a self-timing circuit 26. The self-timing circuit 26 determines the timing, at which a calibration signal is injected, from the transmission timing signal b. During the period of the output of the self-timing circuit 26 the radio frequency continuous wave is modulated by the modulator 24. The pulsed RF calibration signal is distributed by a distributer 28 into two calibration signals a1 and a2 which are, in turn, injected in the same amplitude and phase relation into the sum $\Sigma$ and difference $\Delta$ channels.

Figure 3:
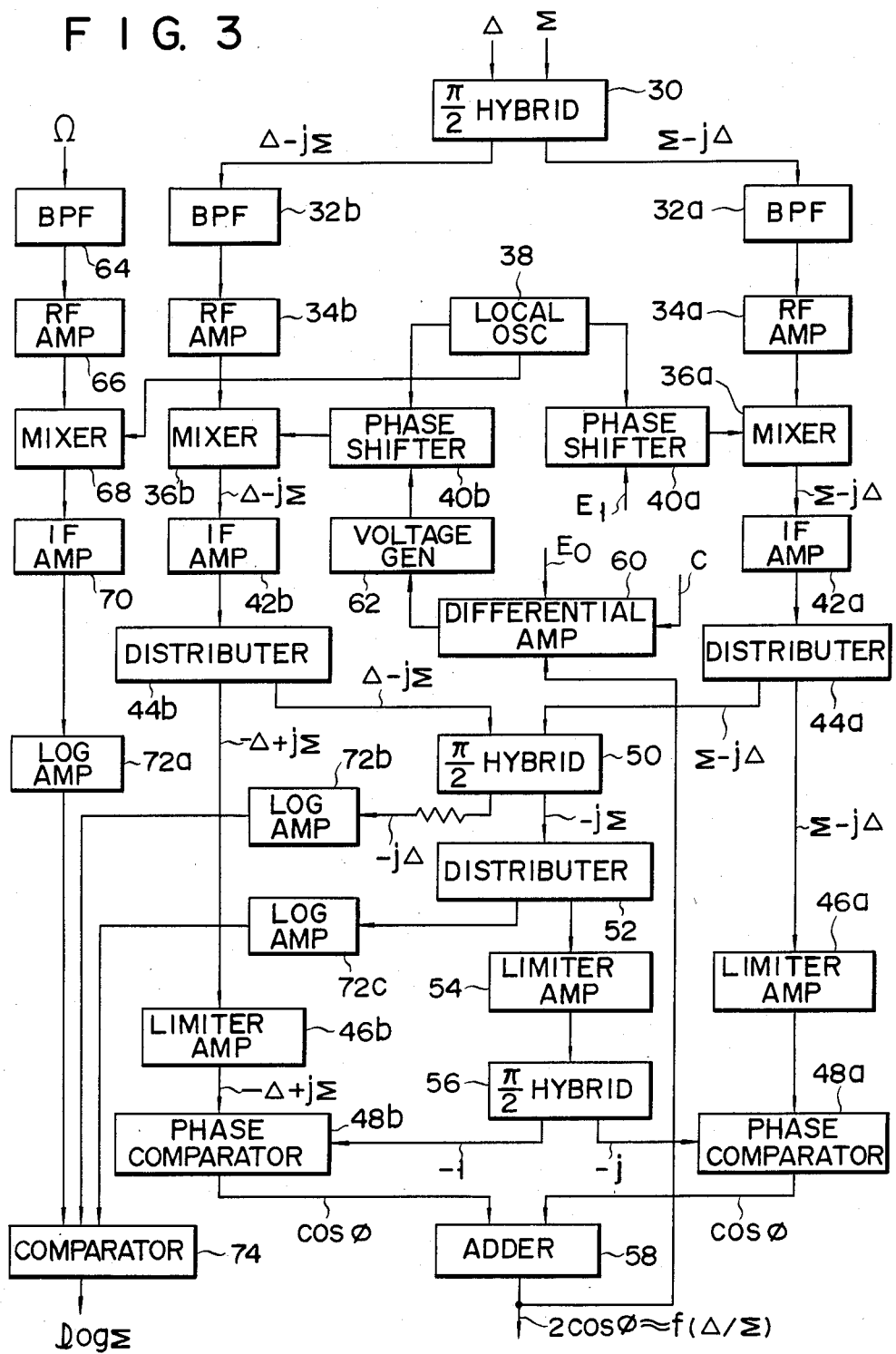
FIG. 3 is a block diagram showing a multichannel receiver of FIG. 1.

FIG. 3 shows a detailed block diagram of a multichannel receiver 15. The sum $\Sigma$ and difference $\Delta$ signals are entered into a $\pi/2$ hybrid 30 to obtain $\Sigma - j\Delta$ and $\Delta - j\Sigma$ signals. FIGS. 4A and 4B shows a vector expression of the output signals from the $\pi/2$ hybrid 30. The $\pi/2$ hybrid 30 delivers, from a first output terminal, a signal $\Sigma - j\Delta$ with the sum pattern $\Sigma$ as a positive real term and the difference pattern $\Delta$ as a negative imaginary term as shown in FIG. 4A and, from a second output terminal, the signal $\Delta - j\Sigma$ with the difference pattern $\Delta$ as a positive real term and the sum pattern $\Sigma$ as a negative imaginary term as shown in FIG. 4B.

The signal $\Sigma - j\Delta$ is input to a first input terminal of a mixer 36a through a bandpass filter 32a and RF amplifier 34a. A reference signal from a local oscillator 38 is supplied through a phase shifter 40a to a second input terminal of the mixer 36a. A reference voltage $E_1$ is fed to a control terminal of the phase shifter 40a. An output $\Sigma - j\Delta$ (an intermediate frequency) of the mixer 36a is fed through an intermediat frequency (IF) amplifier 42 to a distributer 44a. The signal $\Delta - j\Sigma$ is entered to a first input terminal of a mixer 36b through a bandpass filter 32b and RF amplifier 34b. The mixer 36b receives, at a second input terminal, a reference signal from the local oscillator 38 through a phase shifter 40. The output of a difference amplifier 60, as set out later, is supplied through a control voltage generator 62 to a control terminal of the phase shifter 40b. The output $\Delta - j\Sigma$ (the intermediate frequency) of the mixer 36b is input through an intermediate frequency amplifier 42b to a distributer 44b.

The distributer 44a has two output terminals for no phase shift. The distributer 44b has two output terminals for 0° and 180° phase shift. A first output $\Sigma - j\Delta$ of the distributer 44a is supplied through a limiter amplifier 46a to a first input terminal of a phase comparator 48a and a second output $-\Delta + j\Sigma$ of the distributer 44b is supplied through a limiter amplifier 46b to a first input terminal of a phase comparator 48b. The second output $\Sigma - j\Delta$ of the distributer 44a and first output $\Delta - j\Sigma$ of the distributer 44b are supplied to $\pi/2$ hybrid 50. A first output $-j\Sigma$ of the $\pi/2$ hybrid 50 is distributed by a distributer 52 and supplied through a limiter amplifier 54 to a $\pi/2$ hybrid 56. The outputs $-j$ and $-1$ of the $\pi/2$ hybrid 56 are supplied, as reference signals, to phase comparators 48a and 48b, respectively. The phase comparator 48a makes a phase comparison between the signals $\Sigma - j\Delta$ and $-j$ to obtain $\cos \phi$ signal ($\phi$ is a phase difference between two input signals). The phase comparator 48b makes a phase comparison between the signals $-\Delta + j\Sigma$ and $-1$ to obtain $\cos \phi$ signal ($\phi$ is a phase difference between two input signals). An adder 58 produces, through addition, an output $2 \cos \phi$ corresponding to an off-boresight signal $f(\Delta/\Sigma)$. The output $2 \cos \phi$ of the adder 58 is compared by the difference amplifier 60 with the reference signal $E_0$. A timing signal c, which is synchronized with a transmission timing signal b for determining a comparison timing, is supplied to the differential comparator 60.

The multichannel receiver 15 includes one more channel ($\Omega$ channel) for a signal which is obtained from a antenna having omni-directional horizontal pattern for sidelobe response suppression. For this reason, the radiation pattern of the horizontal omni-directional antenna, not shown, is supplied to a first input terminal of a mixer 68 through a bandpath filter 64 and RF amplifier 66. The reference signal of the local oscillator 38 is supplied to a second input terminal of the mixer 68. The output signal $\Omega$ (the intermediate frequency) of the mixer 68 are entered into a comparator 74 through an intermediate frequency amplifier 70 and logarithmic amplifier 72a. The output signal $-j\Delta$ of the $\pi/2$ hybrid 50 is supplied to the comparator 74 through a logarithmic amplifier 72b. The output signal $\Sigma$ of the distributer 52 is supplied through a logarithmic amplifier 72c to the comparator 74. The comparator 74 compares log $\Sigma$ with log $\Omega$ and log $\Sigma$ with log $\Delta$ to produce a "1" level signal, referred to as the sidelobe suppressed signal log $\Sigma$, when log $\Sigma >$ log $\Omega$ and log $\Sigma >$ log $\Delta$.

The operation of one embodiment will be explained below.

Radar pulses are radiated in a predetermined cycle from the radiators 11 and 12 in the transmitter. 2 cos $\phi$ signal is obtained from the multichannel receiver 15, whose RF input is derived from the two radiation patterns, the sum pattern $\Sigma$ and the difference pattern $\Delta$. From 2 cos $\phi$ signal, it is possible to obtain an amplitude ratio $\Delta/\Sigma$. The direction angle of a target object is obtained, by a monopulse signal processing circuit 20, through a $\Delta/\Sigma$ versus angle table. Where there is no echo information in the neighborhood of an end of the respective transmission cycle of the radar pulse, the RF calibration signals a1 and a2 from the calibration signal generator 18 are injected, in the same amplitude and phase, into the sum $\Sigma$ and difference $\Delta$ channels, respectively, through the directional couplers 16 and 17. At this time, the off-boresight signal f ($\Delta/\Sigma$) points at a predetermined direction, a predetermined angle from the boresight axis, since $\Sigma = \Delta$. For this reason, the outputs of the phase comparators 48a and 48b should have a predetermined level. If there is any unbalance, in at least one of the amplitude and phase characteristics, between the feeder and/or between the channels of the receiver, the outputs of the phase comparators 48a and 48b are deviated from the predetermined levels due to the function of the multichannel receiver 15. If there is any unbalance only in the phase characteristic, the outputs from the phase comparators 48a and 48b are deviated from the predetermined levels. If there is any unbalance only in the amplitude characteristic, the error component caused from the unbalance of the amplitude characteristic appears in the form of phase shift and then the outputs from the phase comparators 48a and 48b are also deviated from the predetermined levels. If, therefore, 2 cos $\phi$ signal is detected at the time the calibration signal is injected, then it is possible to detect such an unbalance. In this embodiment, the output signal 2 cos $\phi$ of the adder 58 for adding together the outputs of the phase comparators 48a, 48b is compared, by the differential amplifier 60, with the reference value E$_0$ corresponding to a predetermined value. When the unbalance between the channels is detected at the differential amplifier 60, control is made of the phase of the reference signal which is supplied to the mixer 36b in accordance with a result of the unbalance. The phase control of the reference signal to be supplied to the mixer 36b, adjusts the phase of the intermediate frequency signals $\Sigma - j\Delta$, $-\Delta + j\Sigma$ so as to make equal 2 cos $\phi$ with E$_0$ and thus compensates for the unbalance, in phase and amplitude characteristics, between the channels.

A second embodiment of the monopulse radar equipment according to this invention will be explained below.

FIG. 5 is a block diagram of the monopulse radar equipment. The same reference numerals are employed in FIG. 5 to designate elements corresponding to those shown in FIG. 1. In the first embodiment, the calibration signal is injected into the sum $\Sigma$ and difference $\Delta$ channels between the rotary joint 14 and the multichannel receiver 15. In the second embodiment, the calibration signal is injected into sum $\Sigma$ and difference $\Delta$ channels between a beam forming network 13 and a rotary joint 14. That is, directional couplers 16 and 17 interposed in the sum $\Sigma$ and difference $\Delta$ channels between the beam forming network 13 and the rotary joint 14. RF calibration signals a1 and a2 from the calibration signal generator 18A, while having the same amplitude and phase, are injected respectively through the directional couplers 16 and 17 into the sum $\Sigma$ and difference $\Delta$ channels. In the first embodiment, the injection timing of the calibration signal is determined based on a transmission timing signal from a transmitter side. In the second embodiment, since the calibration signal generator 18A is located at the antenna side with respect to the rotary joint 14, it is necessary to, in order to obtain the same feature as in the first embodiment, send the transmission timing signal through the rotary joint 14, resulting in a complex arrangement. In the second embodiment, the injection timing is determined in the calibration signal generator 18A from the radar transmitted signal. Furthermore, a power source for the calibration generator 18A is, for example, of a battery type.

Figure 6:
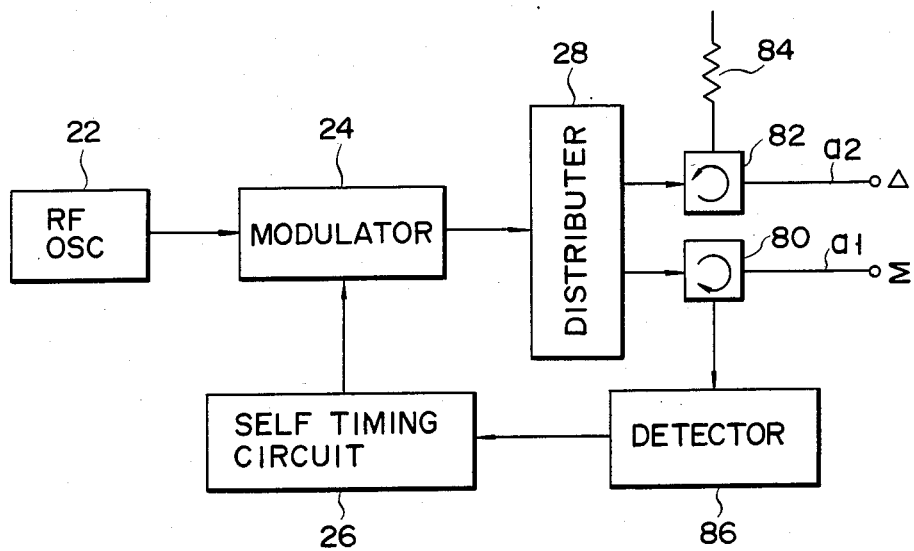
FIG. 6 is a block diagram showing a calibration signal generator of FIG. 5.

FIG. 6 shows a detail of the calibration signal generator 18A. The output calibration signals a1 and a2 of a distributer 28, while having the same amplitude and phase, are injected respectively through circulators 80 and 82 into the sum $\Sigma$ and difference $\Delta$ channels. A signal from the differential $\Delta$ channel is supplied to a dummy load 84 through the circulator 82. A radar transmitted signal from the sum $\Sigma$ channel is supplied to the detector 86 through the circulator 80. The detector 86 detects the envelope of a radar transmitted signal and has its output connected to a self timing circuit 26.

The operation of the second embodiment is similar to that of the first embodiment, except that the injection timing of the calibration signal is found from a radar transmitted signal which is different from the transmission timing signal. The calibration signal is injected at about a point of time at which the echo signal cannot be received.

This invention can be changed or modified in a variety of ways without being restricted to the abovementioned embodiments. Although in the above-mentioned embodiment the phase of the reference signal, supplied to the mixers 36a, 36b to permit the RF signals $\Sigma - j\Delta$ and $\Delta - j\Sigma$ to be converted to intermediate frequency $\Sigma - j\Delta$ and $\Delta - j\Sigma$, is adjusted so as to compensate for any detected unbalance in the amplitude and phase between the channels, this invention is not restricted to such an aspect. For example, the reference phase signals $-j$, $-1$ to phase comparators 48a, 48b, that is, the outputs of the π/2 hybrid 56 may be phase adjusted and the signals Σ−jΔ and Δ−jΣ per se may be phase adjusted. In summary, a signal phase controller may be inserted between the output terminal of the beam forming network 13 and the output terminal of phase comparators 48a, 48b for finding the cos φ signal in the multichannel receiver 15. Although in the above-mentioned embodiment the phase control has been effected between the channels so as to compensate for any detected unbalance in the amplitude and phase between the channels, it is possible to maintain the outputs of the phase comparators 48a and 48b at the predetermined levels by controlling a gain (or attenuation level), since the unbalance of the amplitude characteristic appears in the form of the phase shift in the multi-channel receiver. It is possible to control the amplitude of the reference signals supplied to the mixers 36a and 36b. Or, both of the phase and gain balance may be controlled. As the calibration signals to be injected into the respective channels use is made of the signals of the same phase and amplitude. However, any proper signal may be employed instead. In actual practice, the calibration signals of the above-mentioned amplitude and phase should be the off-boresight signals representing a predetermined direction deviated at a predetermined angle from the boresight axis. When the unbalance between channels depends upon the value of the off-boresight angle, a calibration operation for each off-boresight angle should be performed with the pertinent amplitude of the calibration signal for that angle. In this case, the optimum compensation value can be found out and more fine calibration can be obtained.

As explained above, a highly accurate monopulse radar equipment can be implemented which adjusts any detected unbalance in the phase and amplitude characteristics between the channels in accordance with a deviation of the off-boresight signal at the injection of the calibration signals into the respective channels and thus can comprehensively evaluate, for compensation, an unbalance in the amplitude and phase characteristics between the channels in a feeder and receiver, as well as the aging and temperature variation of the characteristics.

What is claimed is:

1. A monopulse radar equipment comprising:
   first and second radiators arranged in symmetrical positions with respect to a boresight axis for radiating radar pulses in a predetermined cycle and for producing first and second directional radiation patterns;
   beam forming means for synthesizing the first and second directional radiation patterns, in an in-phase and opposite-phase relation and for producing a sum radiation pattern signal and a difference radiation pattern signal;
   a multichannel receiver for generating, from the sum and difference pattern signals, an off-boresight signal representing a deviation of a target object from the boresight axis;
   first and second directional couplers arranged in sum and difference pattern signal transmission channels between the beam forming means and the multichannel receiver;
   calibration signal generating means connected to the first and second directional couplers for injecting first and second calibration signals into the sum and difference pattern signal transmission channels; and
   compensating means connected to an output of the multichannel receiver for detecting the calibration signal and for compensating for a phase characteristic and/or an amplitude characteristic of the sum and difference pattern signal transmission channels in accordance with a result of detection.

2. A monopulse radar equipment according to claim 1, in which said calibration signal generating means injects the first and second calibration signals of the same phase and amplitude onto the sum and difference pattern signal transmission channels.

3. A monopulse radar equipment according to claim 1, in which said multichannel receiver also generates, from the sum, difference and omni-directional pattern signals, a sidelobe suppressed signal for suppressing a sidelobe response for the sum radiation pattern signal.

4. A monopulse radar equipment according to claim 1, in which said calibration signal generating means injects the first and second calibration signals onto the sum and difference pattern signal transmission channels in a timing determined in accordance with a transmission timing of the radar pulse.

5. A monopulse radar equipment according to claim 4, in which said calibration signal generating means injects the first and second calibration signals onto the sum and difference pattern signal transmission channels during a time period in which there is no response to the radar pulse in a neighborhood of an end of a radar pulse transmission cycle.

6. A monopulse radar equipment according to claim 1, in which said multichannel receiver means is connected to said beam forming means through a rotary joint and said first and second directional couplers are connected between the rotary joint and the multichannel receiver.

7. A monopulse radar equipment according to claim 6, in which said calibration signal generating means comprises a radio frequency oscillator, a timing circuit connected to receive a timing signal in synchronism with a radar pulse transmission timing signal and to determine an injection timing of the calibration signal, a modulator for modulating an output of the radio frequency oscillator during a time period corresponding to that of an output of said timing circuit, and distributer means for dividing an output of the modulator into the first and second calibration signals.

8. A monopulse radar equipment according to claim 1, in which said multichannel receiver is connected to said beam forming means through a rotary joint, and said first and second directional couplers are connected between said beam forming means and the rotary joint.

9. A monopulse radar equipment according to claim 8, in which said calibration signal generating means comprises a radio frequency oscillator, a modulator for modulating an output of the radio frequency oscillator, distributer means for dividing an output of the modulator into the first and second calibration signals, a three-terminal circulator means connected between a first output terminal of the distributer and the sum radiation pattern signal channel, an envelope detector connected to the other terminal of the circulator to envelope detect a radar transmitted signal passed through the sum radiation pattern signal transmission channel, and a timing circuit for determining an injection timing of a calibration signal and modulation timing of the modulator in accordance with an output of the envelope detector.

10. A monopulse radar equipment according to claim 1, in which said multichannel receiver comprises a $\pi/2$ hybrid for producing $\Sigma-j\Delta$ and $\Delta-j\Sigma$ signal from the sum radiation pattern signal $\Sigma$ and the difference radiation pattern signal $\Delta$, mixer means for mixing the $\Sigma-j\Delta$ and $\Delta-j\Sigma$ signals from the $\pi/2$ hybrid with reference oscillation signals and for obtaining intermediate frequency signals $\Sigma-j\Delta$, $\Delta-j\Sigma$, signal distributer means for producing, from the intermediate frequency signals $\Sigma-j\Delta$, $\Delta-j\Sigma$, an intermediate frequency signals $\Sigma-j\Delta$, $-\Delta+j\Sigma$ and reference phase signals $-j$, $-1$, and a phase comparator for comparing a phase of the signal $\Sigma-j\Delta$ with a phase of the reference phase signal $-j$ and a phase of the intermediate frequency signal $-\Delta+j\Sigma$ with a phase of the reference phase signal $-1$; and said compensating means comprises a variable phase shifter for adjusting the phase of the reference oscillation signal to be supplied to the mixer, and a differential amplifier for comparing an output of the phase comparator and a reference signal, which is determined in accordance with a difference in amplitude and phase between the first and second calibration signals and for supplying an output to an adjustment signal input terminal of the variable phase shifter.

11. A monopulse radar equipment according to claim 10, in which said differential amplifier compares an output of said phase comparator and a reference signal only in a timing determined in accordance with a transmission timing of a radar pulse.

12. A monopulse radar equipment according to claim 1, in which said multichannel receiver comprises a $\pi/2$ hybrid for producing $\Sigma-j\Delta$ and $\Delta-j\Sigma$ signals from the sum radiation pattern signal $\Sigma$ and the difference radiation pattern signal $\Delta$, a mixer for mixing the $\Sigma-j\Delta$ and $\Delta-j\Sigma$ signals output from the $\pi/2$ hybrid and reference oscillation signals and for obtaining intermediate frequency signals $\Sigma-j\Delta$, $\Delta-j\Sigma$, signal distributer means for producing, from the intermediate frequency signals $\Sigma-j\Delta$, $\Delta-j\Sigma$, intermediate frequency signals $\Sigma-j\Delta$, $-\Delta+j\Sigma$ and reference phase signals $-j$, $-1$, and a phase comparator for comparing a phase of the intermediate frequency signal $\Sigma-j\Delta$ with a phase of the reference phase signal $-j$ and a phase of the intermediate frequency signal $-\Delta+j\Sigma$ with a phase of the reference phase signal $-1$; and said compensating means comprises a variable phase shifter for adjusting a phase of the reference phase signal to be supplied to the phase comparator, and a differential amplifier for comparing the output of the phase comparator with a reference signal, which is determined in accordance with a difference in phase and amplitude between the first and second calibration signals, and for supplying an output to an adjustment signal input terminal of the variable shifter.

13. A monopulse radar equipment according to claim 12, in which said differential amplifier compares the output of the phase comparator with the reference signal in a timing determined in accordance with a transmission timing of the radar pulse.

14. A monopulse radar equipment comprising:
first and second radiators arranged in symmetrical positions with respect to a boresight axis for radiating radar pulses in a predetermined cycle and for producing first and second directional radiation patterns;

beam forming means for synthesizing the first and second directional radiation patterns in an in-phase and opposite-phase relation and for producing a sum radiation pattern signal and a different radiation pattern signal;

a multichannel receiver connected to said beam forming means through a rotary joint and having two channels which are respectively connected to the sum radiation pattern signal and the difference radiation pattern signal, for generating, from the sum and difference pattern signals, an off-boresight signal representing a deviation of a target object from the boresight axis;

first and second directional couplers arranged in sum and difference pattern signal transmission channels between the beam forming means and the rotary joint;

calibration signal generating means, connected to the first and second directional couplers, for detecting a transmission signal passed through one of the sum and difference pattern signal transmission channels, and for injecting first and second calibration signals into the sum and difference pattern signal transmission channels after a predetermined time has elapsed after detecting the transmission signal; and compensating means connected to an output of the multichannel receiver for detecting the calibration signal and for compensating for a phase characteristic and/or an amplitude characteristic of the sum and difference pattern signal transmission channels in accordance with a result of detection.

15. A monopulse radar equipment according to claim 14, in which said calibration signal generating means injects the first and second calibration signals of the same phase and amplitude onto the sum and difference pattern signal transmission channels.

16. A monopulse radar equipment according to claim 14, in which said multichannel receiver also generates, from the sum, difference and omnidirectional pattern signals, a sidelobe suppressed signal for suppressing a sidelobe response for the sum radiation pattern signal.

17. A monopulse radar equipment according to claim 14, in which said calibration signal generating means injects the first and second calibration signals onto the sum and difference pattern signal transmission channels in a timing determined in accordance with a transmission timing of the radar pulse.

18. A monopulse radar equipment according to claim 17, in which said calibration signal generating means injects the first and second calibration signals onto the sum and difference pattern signal transmission channels during a time period in which there is no response to the radar pulse in a neighborhood of an end of a radar pulse transmission cycle.

19. A monopulse radar equipment according to claim 14, in which said multichannel receiver means is connected to said beam forming means through a rotary joint and said first and second directional couplers are connected between the rotary joint and the multichannel receiver.

20. A monopulse radar equipment according to claim 19, in which said calibration signal generating means comprises a radio frequency oscillator, a timing circuit connected to receive a timing signal in synchronism with a radar pulse transmission timing signal and to determine an injection timing of the calibration signal, a modulator for modulating an output of the radio frequency oscillator during a time period corresponding to that of an output of said timing circuit, and distributer means for dividing an output of the modulator into the first and second calibration signals.

21. A monopulse radar equipment according to claim 14, in which said calibration signal generating means comprises a radio frequency oscillator, a modulator for modulating an output of the radio frequency oscillator, distributer means for dividing an output of the modulator into the first and second calibration signals, a three-terminal circulator means connected between a first output terminal of the distributer and the sum radiation pattern signal channel, an envelope detector connected to the other terminal of the circulator to envelope detect a radar transmitted signal passed through the sum radiation pattern signal transmission channel, and a timing circuit for determining an injection timing of a calibration signal and modulation timing of the modulator in accordance with an output of the envelope detector.

22. A monopulse radar equipment according to claim 14, in which said multichannel receiver comprises a $\pi/2$ hybrid for producing $\Sigma-j\Delta$ and $\Delta-j\Sigma$ signals from the sum radiation pattern signal $\Sigma$ and the difference radiation pattern signal $\Delta$, mixer means for mixing the $\Sigma-j\Delta$ and $\Delta-j\Sigma$ signals from the $\pi/2$ hybrid with reference oscillation signals and for obtaining intermediate frequency signals $\Sigma-j\Delta$, $\Delta-j\Sigma$, signal distributer means for producing, from the intermediate frequency signals $\Sigma-j\Delta$, $\Delta-j\Sigma$, intermediate frequency signals $\Sigma-j\Delta$, $-\Delta-j\Sigma$ and reference phase signals $-j$, $-1$, and a phase comparator for comparing a phase of the signal $\Sigma-j\Delta$ with a phase of the reference phase signal $-j$ and a phase of the intermediate frequency signal $-\Delta+j\Sigma$ with a phase of the reference phase signal $-1$, and said compensating means comprises a variable phase shifter for adjusting the phase of the reference oscillation signal to be supplied to the mixer, and a differential amplifier for comparing an output of the phase comparator and a reference signal, which is determined in accordance with a difference in amplitude and phase between the first and second calibration signals and for supplying an output to an adjustment signal input terminal of the variable phase shifter.

23. A monopulse radar equipment according to claim 22, in which said differential amplifier compares an output of said phase comparator and a reference signal only in a timing determined in accordance with a tranmission timing of a radar pulse.

24. A monopulse radar equipment according to claim 14, in which said multichannel receiver comprises a $\pi/2$ hybrid for producing $\Sigma-j\Delta$ and $\Delta-j\Sigma$ signals from the sum radiation pattern signal $\Sigma$ and the difference radiation pattern signal $\Delta$, a mixer for mixing the $\Sigma-j\Delta$ and $\Delta-j\Sigma$ signals output from the $\pi/2$ hybrid and reference oscillation signals and for obtaining intermediate frequency signals $\Sigma-j\Delta$, $\Delta-j\Sigma$, signal distributer means for producing, from the intermediate frequency signals $\Sigma-j\Delta$, $\Delta-j\Sigma$, intermediate frequency signals $\Sigma-j\Delta$, $-\Delta+j\Sigma$, and reference phase signals $-j$, $-1$, and a phase comparator for comparing a phase of the intermediate frequency signal $\Sigma-j\Delta$ with a phase of the reference phase signal $-j$ and a phase of the intermediate frequency signal $-\Delta+j\Sigma$ with a phase of the reference phase signal $-1$; and said compensating means comprises a variable phase shifter for adjusting a phase of the reference phase signal to be supplied to the phase comparator, and a differential amplifier for comparing the output of the phase comparator with a reference signal, which is determined in accordance with a difference in phase and amplitude between the first and second calibration signals, and for supplying an output to an adjustment signal input terminal of the variable shifter.

25. A monopulse radar equipment according to claim 24, in which said differential amplifier compares the output of the phase comparator with the reference signal in a timing determined in accordance with a transmission timing of the radar pulse.

* * * * *